Nov. 20, 1962     T. DE HEER ET AL     3,064,473

ANEMOMETER

Filed Feb. 4, 1960     2 Sheets-Sheet 1

INVENTORS
TALLECHIENUS DE HEER
PAUL J. ERKELENS
BY
Wenderoth, Lind & Ponack
ATTYS.

Nov. 20, 1962 T. DE HEER ET AL 3,064,473
ANEMOMETER
Filed Feb. 4, 1960 2 Sheets-Sheet 2

INVENTOR.
TALLECHIENUS DE HEER
PAUL J. ERKELENS
BY
Wenderoth, Lind & Ponack
Attys.

United States Patent Office 3,064,473
Patented Nov. 20, 1962

3,064,473
ANEMOMETER
Tallechienus de Heer and Paul Johannes Erkelens, The Hague, Netherlands, assignors to Nederlandse Organisatie voor Toegepast-Natuurwetenschappelijk Onderzoek ten behoeve van de Volksgezondheid, The Hague, Netherlands
Filed Feb. 4, 1960, Ser. No. 6,781
Claims priority, application Netherlands Feb. 17, 1959
2 Claims. (Cl. 73—189)

The determination of the direction of a slow air motion in a space is effected by means of pennants, threads and the like, which are held in the air on rods. From such means certain deductions can be made, but it is only exceptionally that this determination yields data which are fit for calculating purposes, while no information is given about the velocity, unless some other more comprehensive mechanism is used, which, however, is apt to have a disturbing effect.

An anemometer is disclosed in U. S. Patent No. 2,849,880, which anemometer is provided with a heated fork placed on a base and a thermoelement. With this anemometer the velocity can be calculated from the temperature. It must, however, first be arranged in the right direction relative to the air stream.

The present invention relates to an anemometer for determining the direction as well as the velocity of a slow gas or air motion.

According to the invention this anemometer is provided with a fork, the heated legs of which are perpendicular to each other, and with two feelers having a thermoelement each, which feelers are parallel to the fork legs, and is also provided with a driving gear, which causes the fork legs to carry out a rotation about the feelers, and with a registering apparatus for the position of the fork legs with respect to the feelers as well as for the temperature of the thermoelements.

The fork legs, which are heated to equal temperatures, produce a wake flow in the air stream to be measured, the temperature of which wake flow differs from that of the air stream itself due to convection.

This wake flow naturally follows the movement of the fork legs and where said legs carry out a rotation about the feelers a change in the temperature of the thermoelements is brought about, which results in a temperature curve which depends on the position of the leg with respect to feeler. This curve indicates with precision when the wake flow reaches the feeler and leaves it free again, from which the size of the wake flow can be derived, and from this size, according to formulae known in the art, the air velocity can be determined.

Because the two legs and also the feelers are perpendicular to each other, the direction may be determined in very simple fashion from the two graphs of the temperatures with respect to the position.

Because in the anemometer according to the invention the heated legs are used as the disturbance profile, and because only temperature differences deriving from said legs are measured, a much greater freedom for using the anemometer according to the invention for air motions having different and frequently high temperatures has been created.

The invention is hereinafter further described with reference to a drawing in which some embodiments of an anemometer according to the invention and also some of its details and a temperature curve which was registered are schematically shown.

A case 1 is provided with a mounting element 2, by means of which the meter can be mounted on a pedestal or some other device in a space in which the air motion which is to be examined occurs.

Figure 1:
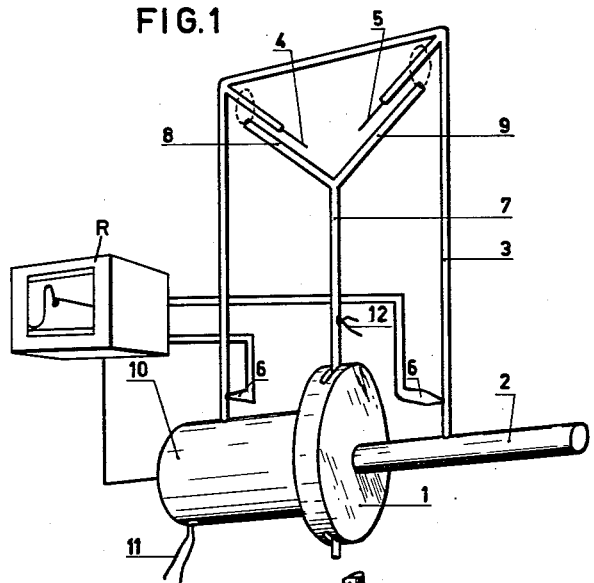
FIG. 1 shows a perspective arrangement of the fork legs, the feelers and the supporting and driving mechanisms.

On the case is a fixed yoke 3 in the corner points of which are mounted two feelers 4 and 5 directed towards each other while being at right angles to one another. Both feelers are equipped with temperature sensing elements, the leads 6 of which lead through the yoke 3 to a registering apparatus R, such as a conventional continuous recording micro-ammeter-micro-voltmeter which records on a moving chart the temperatures sensed. The registering apparatus R is connected to the leads 6 of the feelers, and in order to correlate the recorded temperature with the position of the fork legs with respect to the feelers, there is a connection provided between the registering apparatus and the driving means 10 and the carrier 7 for the fork legs. This connection, shown as a line in FIG. 1, can be any type of connection which insures that the registering apparatus is driven at a speed proportional to the speed of rotation of the fork legs, e.g. a synchronous motor connection or a direct drive connection.

In the bisector plane of the feelers 4 and 5 a carrier 7 having two fork legs 8 and 9 is moved by a mechanism mounted in the case 1, which mechanism is driven by an electromotor 10 having leads 11, the motor being accommodated in the case.

The fork legs 8 and 9, the same as the feelers 4 and 5, are at right angles to one another and by the movement of the carrier 7 they describe a cylinder around the feelers of elliptic cross-section.

The fork legs are heated electrically with the aid of built-in heating elements which are fed through leads 12. As a matter of course the same energy is supplied to both legs.

Figure 2:
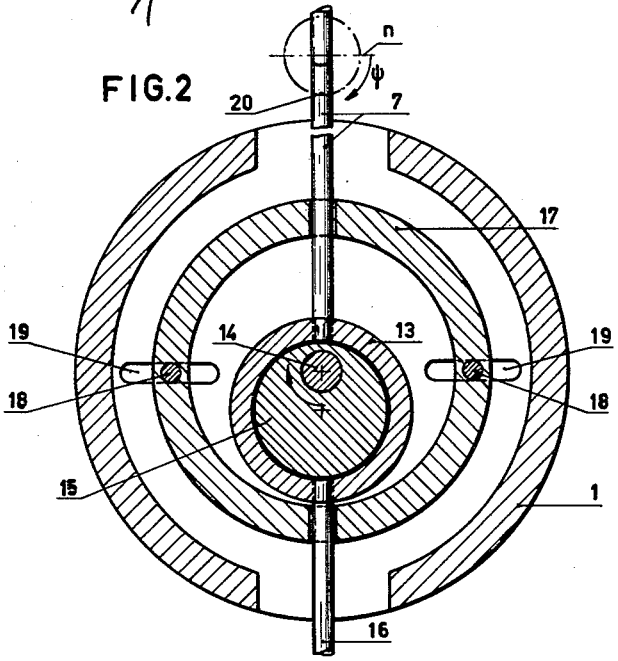
FIG. 2 shows a longitudinal cross-section through a driving gear.

The motion of the carrier 7 is obtained with the aid of the mechanism according to FIG. 2.

The carrier 7 is connected to a ring 13, in which a disc 15 can rotate, said disc being fixed eccentrically with respect to a shaft 14 which can rotate in the case 1. At the opposite end of the ring 13 an extension piece 16 of the carrier 7 is provided.

The carrier 7 and the extension piece 16 are slidably mounted in a second ring 17. This ring 17 can only carry out a horizontal movement in the case 1, because pins 18 of the ring 17 can slide backwards and forwards in slots 19 in the case 1.

The shaft 14 is driven by the motor 10 and in this manner each point of the carrier 7 follows a circular path as is indicated by point 20. The angle $\psi$ is used as the abscissa for the graphs, and the line $n$, which is perpendicular to the plane through the feelers is taken as the O, the temperature being the ordinate for said graphs.

Figure 3:
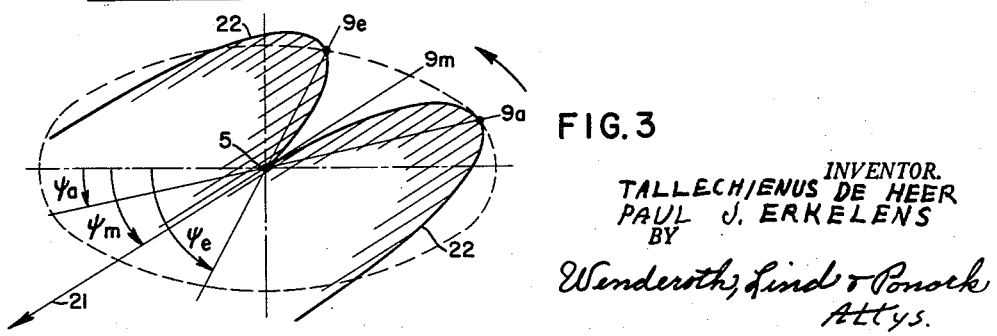
FIG. 3 shows a diagram of the wake flow in different positions.

The legs 8 and 9 each enclose an angle of 45° with the plane in which the carrier 7 moves, but naturally follow the movement of said carrier, whereby, therefore, they do not describe a true circular cylinder, but an elliptical cylinder, the long axis of which is horizontal and is larger by $\sqrt{2}$ than the short axis, as shown in FIG. 3 in a sectional view of a feeler 5 and a leg 9.

An air motion from a direction as indicated by the arrow 21 and having a given velocity, in brushing past a fork leg 9 will produce a particular wake flow 22, which wake flow will attain a temperature which differs from the temperature of the air and which is caused by conduction from the heated fork legs, which wake flow moves along with the leg 9.

Figure 4:
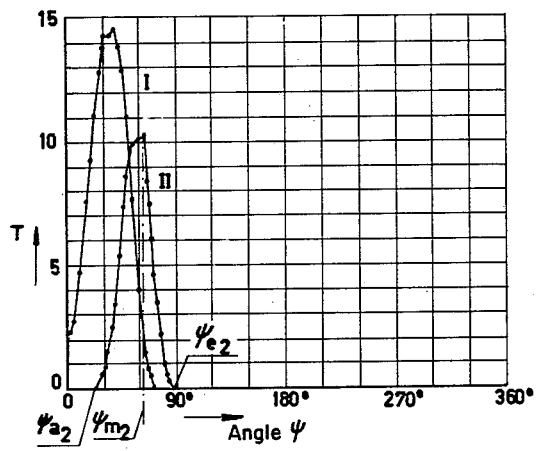
FIG. 4 shows a graph showing the connection between temperature and angle position.

As soon as the wake flow 22 in the position 9a of the leg 9 at an angle $\psi$ hits the feeler 5, which causes the latter to be heated, the temperature of said feeler rises and a graph such as is represented in FIG. 4 of such temperature for various angular positions can be drawn, and in which graphs it is seen that with the legs in the 9m position the maximum temperature is reached, while in the 9e position the temperature has dropped again, because the wake flow 22 has passed the feeler.

Because the angular position $\psi$ of the fork legs has been set out horizontally and the temperature of the two thermoelements in the feelers vertically, it is possible in a simple way to derive from the curves I and II, from which direction with respect to each of the feelers the air motion comes.

Because the legs as well as the feelers are at right angles to each other, determining the direction in the space is possible.

Figure 5:
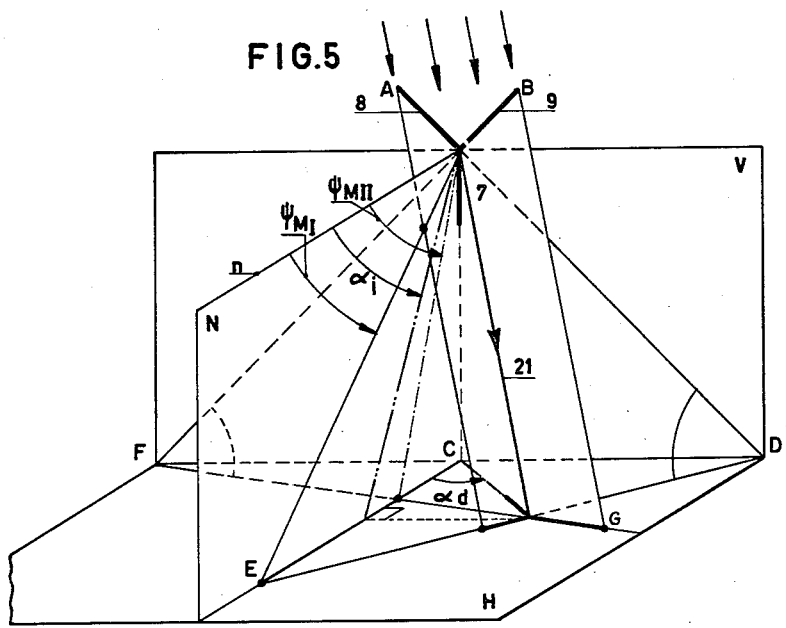
FIG. 5 shows the correlation between the angles $\varphi$ which have been measured and the angles with a fixed system of co-ordinates with respect to the anemometer.

FIG. 5 illustrates the relationship existing between the measured angles $\psi_{mI}$ and $\psi_{mII}$ of the peaks in two curves I and II belonging together, and between the angles $\alpha i$ and $\alpha d$ of the direction of velocity 21 with a system of co-ordinates fixed relative to the anemometer.

The system of co-ordinates is formed between the plane V through the legs 8 and 9, and the plane N in which the motion takes place, i.e. the plane in which the cross-section of FIG. 2 has been taken, and the horizontal plane H.

The direction 21 of the velocity of the air together with the legs 8 and 9 forms two planes ADE and BFG, in which the maximum temperature is measured. Said planes intersect the plane N on lines which form angles $\psi_{mI}$ and $\psi_{mII}$ with the normal $n$ to the plane V.

If the angles $\psi_{mI}$ and $\psi_{mII}$ are known from the graphs the angles $\alpha i$ and $\alpha d$ which are formed by the direction 21 with the system of co-ordinates, can be determined by the aid of stereometry either from the figure or from a goniometric connection.

This relationship is as follows $$2 \text{ tg } \alpha i = \text{ tg } \psi_{mI} + \text{ tg } \psi_{mII}$$
$$2 \text{ tg } \alpha d = \text{ tg } \psi_{mI} - \text{ tg } \psi_{mII}$$

As a matter of course other driving mechanisms for the fork legs are also possible, provided they both carry out equal movements with respect to the feelers.

In addition to the direction 21 of the velocity, the magnitude of the velocity can be derived from the width of the temperature curve half-way to the top. (Grenzschichttheorie, a book by H. Schlichting, 1951 Edition page 447–449.)

We claim:

1. An anemometer for measuring the direction and velocity of a current of gaseous medium, comprising a fork member having at least two legs at an angle to each other, means for heating said legs, a carrier on which said fork member is mounted, a plurality of fixed temperature sensing feelers, one positioned parallel to each leg of said fork member, a driving means on which said carrier is mounted driving said fork member and said legs around said feelers with the feelers and legs substantially parallel to each other during the movement of the legs relative to the feelers, and means coupled to said driving means and carrier for indicating the different positions of the fork legs with respect to said feelers, whereby when the temperatures sensed by said feelers at the different positions of said legs relative to said feelers are plotted against the angular positions of said legs relative to said feelers, the velocity of a gaseous medium passing said legs and feelers as well as the direction of movement of said gaseous medium can be calculated.

2. An anemometer as claimed in claim 1 in which there are two fork legs and two feelers, said legs being at an angle of 90° to each other and said feelers being at an angle of 90° to each other.

References Cited in the file of this patent
UNITED STATES PATENTS
2,849,880     Obermaier _____ Sept. 2, 1958